United States Patent [19]

Hawle

[11] Patent Number: 4,706,529
[45] Date of Patent: Nov. 17, 1987

[54] A METHOD OF MAKING A CLAMPING RING FOR USE IN A PIPE JOINT

[75] Inventor: Erwin Hawle, Vöcklabruck, Austria

[73] Assignee: E. Hawle & Co., Vocklabruck, Austria

[21] Appl. No.: 922,306

[22] Filed: Oct. 23, 1986

Related U.S. Application Data

[62] Division of Ser. No. 704,711, Feb. 25, 1985, Pat. No. 4,657,288.

[51] Int. Cl.$^4$ ................................................ B23B 1/00
[52] U.S. Cl. ...................................... 82/1 C; 29/27 C; 82/34 R; 409/132; 409/165; 409/199; 409/240
[58] Field of Search ............... 82/1 C, 34 R; 409/131, 409/132, 165, 199, 240; 29/27 R, 27 A, 27 C

[56] References Cited

U.S. PATENT DOCUMENTS

| | | | |
|---|---|---|---|
| 1,057,005 | 3/1913 | Miles | 409/240 |
| 3,212,405 | 10/1965 | Smith | 409/199 |
| 3,724,327 | 4/1973 | Gillberg | 409/165 |
| 4,028,992 | 6/1977 | Kuehnle | 409/199 |
| 4,198,182 | 4/1980 | Green | 409/132 |
| 4,215,603 | 8/1980 | Jones | 82/1 C |

Primary Examiner—Nicholas P. Godici
Assistant Examiner—Jerry Kearns
Attorney, Agent, or Firm—Karl F. Ross; Herbert Dubno

[57] ABSTRACT

A clamping ring for use in pipe joints has an inside surface which is formed with generally peripherally extending indentations for axially fixing a pipe. In order to prevent an occurrence of dangerous stress concentrations in pipes in contact with such clamping rings and to permit such rings to be manufactured economically, the clamping ring is formed on its inside surface with a multiplicity of generally peripherally extending indentations, each of which extends only along part of the periphery of said inside surface, and said indentations are offset from each other in said peripheral directions and adjoint or overlap.

2 Claims, 5 Drawing Figures

4,706,529

A METHOD OF MAKING A CLAMPING RING FOR USE IN A PIPE JOINT

CROSS REFERENCE TO RELATED APPLICATIONS

This application is a division of application Ser. No. 704,711, filed Feb. 25, 1985, now U.S. Pat. No. 4,657,288.

FIELD OF THE INVENTION

This invention relates to clamping ring for use in a pipe joint, which ring has an inside surface formed with peripherally extending indentations. This invention relates also to a process and apparatus for making such clamping rings.

DESCRIPTION OF THE PRIOR ART

Clamping rings can be used in pipe joints which are adapted to take up axial loads applied to the pipes and which are not only leakage-proof but will provide also a thrust-resisting mechanical coupling. Such clamping rings have a conical outside surface, which cooperates with a mating conical inside surface of a pipe socket and by means of such socket can be forced onto the outside surface of a pipe. Such clamping rings have a serrated inside surface, which is in pressure contact with the outside surface of the pipe to hold the pipes against an axial displacement. The known clamping rings are formed on their inside surface with annular indentations so that the lands remaining between the annular indentations will apply pressure to the outside surface of the pipe and said outside surface will thus be deformed to have annular peripheral grooves. Such a shape of the pipe will result in a high stress concentration, which may cause the pipe to crack under high load. Particularly pipes made of plastic, such as plyvinylchloride and polyethylene, which are increasingly used in underground pipelines owing to their resistance to corrosion, are highly susceptible to stress concentration so that the use of the known clamping rings in joints between such plastic pipes will give rise to difficulties.

OBJECTS OF THE INVENTION

It is an object of the invention to provide a clamping ring which avoids dangerous stress concentrations in pipes connected by a joint comprising such clamping ring and which ensures that pipes connected by such joint will be reliably and firmly held in position even when subjected to high axial loads.

It is another object of the invention to provide a process and apparatus for an economical manufacture of such clamping rings.

SUMMARY OF THE INVENTION

This object is accomplished in accordance with the invention in that the clamping ring is formed in its inside surface with a multiplicity of generally peripherally extending indentations, each of which has a length which is only a fraction of the peripheral extent of said inside surface, and laterally adjacent ones of said indentations adjoin or overlap and are peripherally offset from each other. In such a clamping ring, ridges are formed between the indentations so that the inside surface of the clamping ring is formed with thin, closely spaced apart serrations, which apply pressure to the outside surface of the associated pipe in small surface portions, which are distributed over a large surface area whereas dangerous stress concentrations are avoided because there are no peripherally extending, annular indentations. Nevertheless an excellent pressure contact between the clamping ring and the pipe is ensured by the large number of distributed small indentations.

A clamping ring may be formed with such indentations in a simple and economical process, in which a cutting tool is used to cut the indentations into the inside surface of the clamping ring while the latter is rotated about its axis. A lathe tool has previously been used to cut annular peripheral indentations into the inside surface of the clamping ring. In accordance with the invention, a large number of staggered indentations are cut into the inside surface of the clamping ring by means of a cutting tool, which is subjected to a movement tending to revolve the tool on a circular orbit which is smaller in diameter than the inside surface of the clamping ring and extends in a plane that is transverse to the axis of the clamping ring, and a straight feed movement which is parallel to the axis of the clamping ring is simultaneously imparted to the tool. In that operation, a crescent-shaped indentation is cut into the inside surface of the clamping ring by the tool during each revolution thereof and owing to the straight feed movement of the tool said indentations will extend along a helix. Mutually offset indentations equal in number to the revolutions of the cutting tool will thus be formed and because the rotation of the clamping ring and the straight feed movement of the tool are superposed and said indentations in their entirety will constitute the desired serrations on the inside surface of the clamping ring. The pattern of such serrations will depend on the diameter of the inside surface of the clamping ring, on the number of revolutions per minute of the cutting tool, on the diameter of its orbit, as well as on the speed of the clamping ring, the velocity of the feed movement of the tool, the shape of the tool and the depth of cut. The serrations on the inside surface of the clamping ring can be varied in dependence on the selection or variation of one or more of the parameters stated above. In this way, the serrations can be adapted to the desired retaining properties, to the materials of the pipes and to their surface finish.

It will be particularly desirable to cause the cutting tool to revolve in a plane which is at an acute angle to a normal plane on the axis of the clamping ring because the movement of the cutting tool along such an inclined orbit will result in sawtooth-shaped serrations, which will ensure an improved fixation of the pipes.

The process in accordance with the invention can be carried out in a suitable manner by means of a lathe comprising a drivable chuck for rotating the clamping ring and a carriage, which is movable along the axis of the chuck and carries the cutting tool, wherein the carriage carries a milling unit, which comprises a cutter spindle that extends toward the chuck and carries a radial cutter tooth which constitutes a cutting tool. Such lathe can be provided by a simple alteration of an existing lathe so that it can be used to carry out the process in accordance with the invention. During the operation of such lathe, the cutter tooth of the milling unit will cut the several indentations quickly and without difficulty and the pattern of the serrations can also be influenced as desired without difficulty. If the cutter spindle extends at an angle to the axis of the chuck, the cutting tool will revolve along an inclined plane so that the angle of inclination of the cutter spindle and the sawtooth shape of the serrations can be changed by a single adjustment.

SPECIFIC DESCRIPTION

A thrust-resistant pipe joint which is not susceptible to dangerous stress concentrations comprises a clamping ring 1, which is formed in its inside surface 2 with a large number of elongated generally peripherally extending indentations 3, which are offset from each other in the peripheral and axial directions and overlap. Owing to these indentations the inside surface 2 is formed with dense shingled serrations and adjacent indentations are separated by arcuate ridges 4, which like the indentations 3 extend generally peripherally and are also offset from each other and form a mesh pattern. In pressure contact with the outside surface of a pipe, such an inside surface 2 will not deform said outside surface to form annular indentations therein so that damage to the pipe due to stress concentration need not be feared. Nevertheless, the large number of indentations 3 and their shingled arrangement result in a strong pressure contact between the clamping ring 1 and the outside surface of the pipe so that the pipe will be firmly held against axial displacement.

Figure 1:
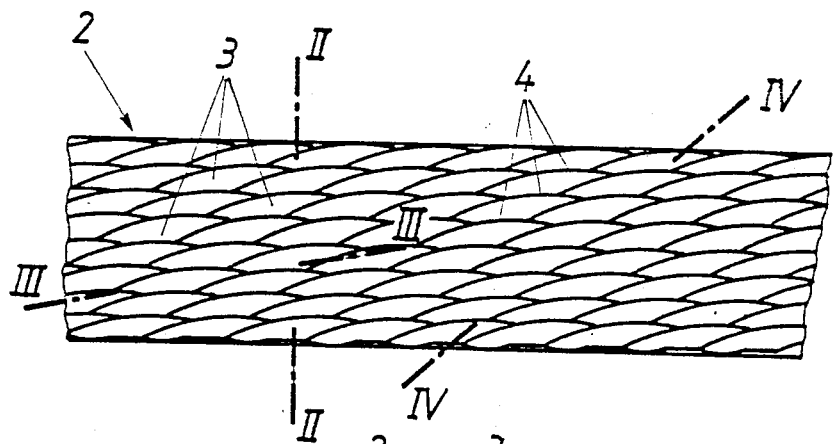
FIG. 1 is a developed view showing the inside surface of a clamping ring according to the invention.
Figure 2:
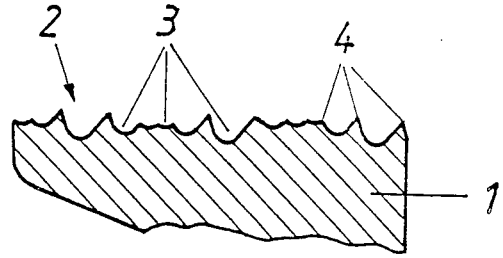
FIGS. 2, 3 and 4 are enlarged sectional views taken on lines II—II, III—III and IV—IV, respectively, in FIG. 1.
Figure 3:
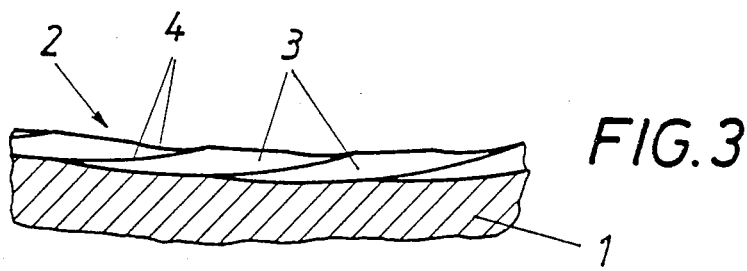
Figure 4:
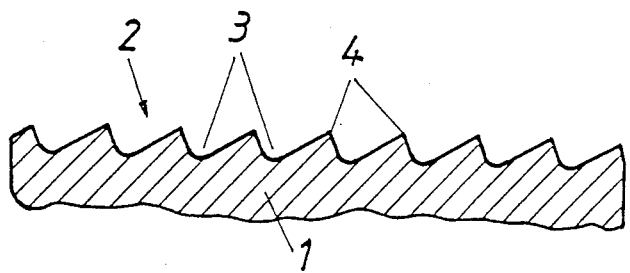

It is apparent from FIG. 2 that the ridges 4 have different heights in a cross-sectional plane of the clamping ring 1. This is due to the fact that adjacent indentations 3 overlap.

Figure 5:
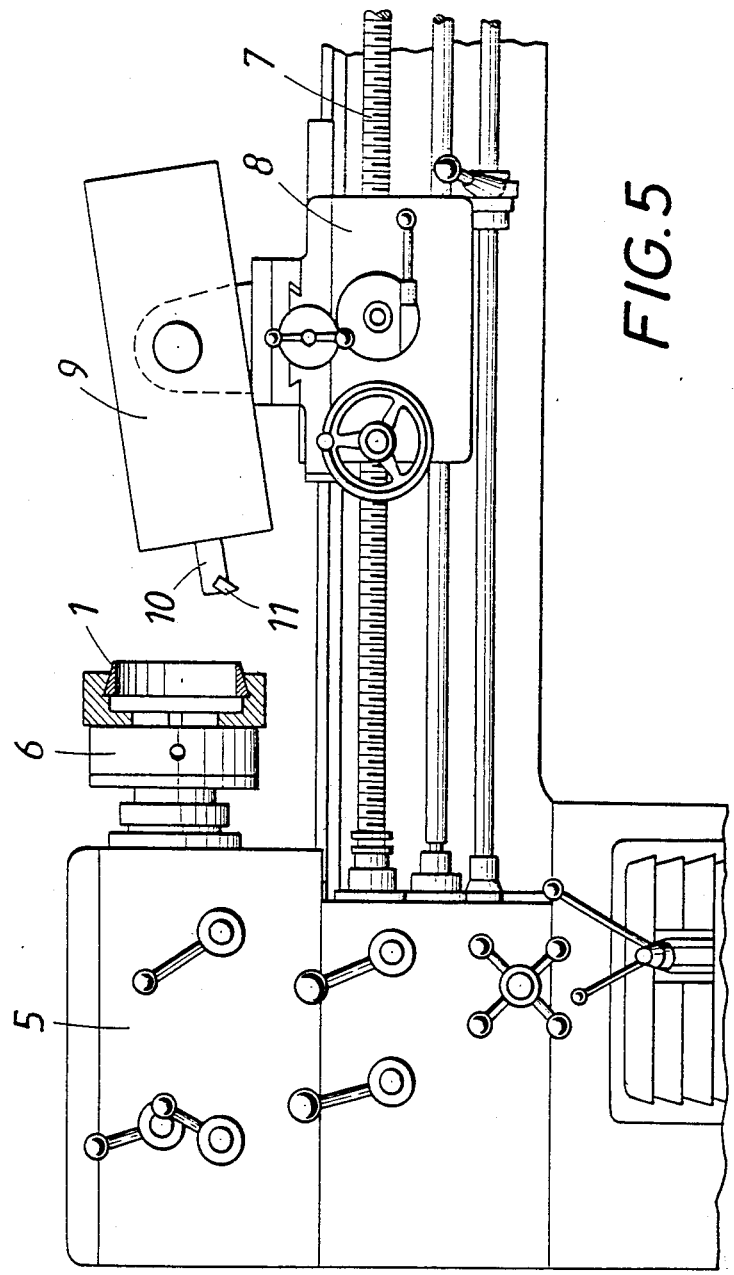
FIG. 5 is a side elevation showing apparatus for shaping said inside surface.

As is apparent from FIG. 5 a clamping ring 1 may be formed with such a serrated inside surface 2 by means of a simple lathe 5, which comprises a rotatable chuck 6, which is adapted to be driven, and a carriage 8, which is axially movable by means of a lead screw 7 and carries a milling unit 9. The clamping ring is fixed in the chuck 6 and is shaped on the inside surface 2 of the ring 1 by a radial cutter tooth 11, which is non-rotatably secured to a cutter spindle 10 of the unit 9. As the spindle 10 rotates, the cutter tooth tends to revolve on a circular orbit and by means of the carriage 8 a straight feed movement that is parallel to the axis of the clamping ring is imparted to the cutter tooth 11. The clamping ring 1 is rotated by the chuck 6 at the same time. An upward cut is provided in that the cutter spindle 10 and the chuck 6 are rotated in mutually opposite directions. Because the rotation of the chuck and the movement of the carriage are superposed, the indentations successively cut into the inside surface 2 of the clamping ring 1 will extend along a helix. The pattern of the serrations formed on the inside surface 2 of the clamping ring 1 will be determined by the ratio of the movements described hereinbefore, by the number of revolutions per minute of the cutter tooth 11 and by the radius of its orbit.

For a given diameter of the inside surface, the shape of each indentation will be determined by the shape of the cutter tooth 11 and by its depth of cut. If the cutter spindle 10 is inclined relative to the axis of the clamping ring, the indentations will be unsymmetrical in cross-section so that the serrations on the inside surface will have a sawtooth shape depending on the angle of inclination.

The serrations formed in accordance with the invention on the inside surface 2 of the clamping ring ensure that a pipe joint provided with such clamping ring will resist high axial loads and will have optimum force-transmitting properties without giving rise to dangerous stress concentrations. For this reason, clamping rings having such inside surfaces are particularly suitable for joints between plastic pipes or between joints made of other materials which are susceptible to stress concentrations.

I claim:

1. A method of making a clamping ring for use in a pipe joint, comprising the steps of:
    rotating an annular clamping ring blank having an internal surface about an axis;
    revolving a cutting tool in a plane generally transverse to said axis in a circular orbit which is smaller in diameter than said internal surface and bringing said cutting tool into cutting engagement with said surface to form indentations therein; and
    imparting a feed movement to said cutting tool concurrently with the revolving thereof in said circular orbit, whereby the indentations formed in said surface are contiguous, generally elongated and defined by arcuate ridges, with the indentations and ridges extending generally peripherally with respect to said blank, overlapping one another and having adjacent indentations in a direction transverse to the peripheral direction peripherally offset from one another.

2. The method defined in claim 1 wherein said plane forms an acute included angle with said axis.

* * * * *